United States Patent Office 3,239,488
Patented Mar. 8, 1966

3,239,488
1:5 DIENE LINEAR COPOLYMERS
George B. Butler, Gainesville, Fla., assignor to Peninsular ChemResearch, Inc., Gainesville, Fla., a corporation of Florida
No Drawing. Filed Apr. 2, 1962, Ser. No. 184,488
8 Claims. (Cl. 260—63)

This invention is directed to novel linear copolymeric highly molecular materials, and to processes for making the same. More particularly, this invention is directed to linear copolymers having repeating units in the polymeric chain exemplified by the following structure:

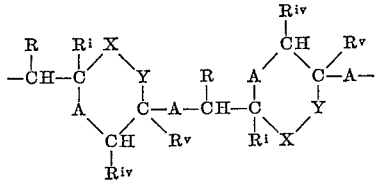

wherein A, R, $R^i$, X, Y, $R^{iv}$, $R^v$ having the meaning described hereinafter.

The art of polymerization, copolymerization, and of polymeric and copolymeric resins is highly developed in the use of both mono-olefinic and di-olefinic monomeric reactants. Generally speaking, it is known that an ethylenically unsaturated organic compound can be polymerized to form long-chain linear molecules, respective monomeric reactants adding to each other across the respective carbon-carbon double bonds. It is also generally known that diethylenically unsaturated organic compounds having two olefinic double bonds may be polymerized to form large molecules having a cross-linked structure. It is also known that the mono-olefinic and di-olefinic compounds may be copolymerized to form cross-linked large molecules, as a general manner. Cross-linked structures typically are formed because of the di-functionality of the monomer.

In my copending application, Serial No. 720,040, filed March 10, 1958, now U.S. Patent 3,044,986, I have further described certain novel linear homopolymers formed by the free radical polymerization of 1,6-di-unsaturated monomers. The linear homopolymers to which that invention is directed generally having repeating units in the homopolymer molecule corresponding to the structural formula:

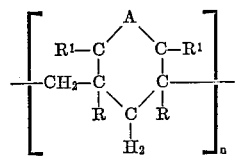

where A is a methylene group or a hetero-atom and R and $R^1$ are organic substituents, $n$ being an integer representing the number of units in the chain.

Still other novel linear homopolymers are described in copending application, Serial No. 720,092, filed March 10, 1958, now U.S. Patent 2,926,161, wherein the homopolymers are composed of repeating units having the structural formula:

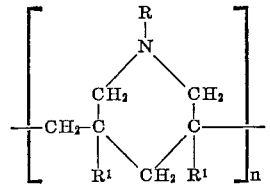

where R, $R^1$, and $n$ have similar significance.

It will be observed that the homopolymers in each of those copending applications having generally linear structures, but that the chain is composed of a series of heterocyclic rings linked to each other through a methylene group, meta to the hetero-atom in the ring.

A class of novel linear copolymers of 1:4-dienes and mono-olefin has also been described in my copending application, Serial No. 803,838, entitled, Linear Copolymers, and filed April 3, 1959, now abandoned. Those copolymers have the repeating unit in the polymeric chain of the structure:

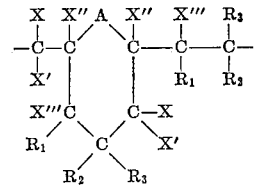

wherein A stands for an element of Groups IVa, Va and VIa of the Periodic Table, the free valencies (as in the case of S, C, Si, N, Sb, Sn, Ge, etc.) are attached to a radical which may be oxygen, hydrogen, lower alkyl, lower alkylene, cyano-lower alkyl, monocyclic aryl, carboxy-lower alkyl and halogen; wherein $R_1$ and $R_2$ may be any of hydrogen, lower alkoyloxy, carboxy lower alkyl, nitrile or carboxyhalide, and together $R_1$ and $R_2$ may represent the anhydride radical

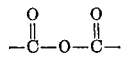

wherein $R_3$ stands for hydrogen or lower alkyl; and wherein X, X', X'', and X''' are any of hydrogen, lower alkyl, monocyclic aryl, nitrile, halogen, and carboxy-lower alkyl.

It will be observed that those copolymers have generally a linear chain composed of hetero- or carbocyclic rings linked at the meta positions to each other by a trimethylene group.

It is an object of this invention to provide a certain distinct and novel linear copolymer and a process for making the same.

More specifically, it is an object of this invention to provide novel linear copolymers wherein the repeating unit in the polymeric chain has the structure:

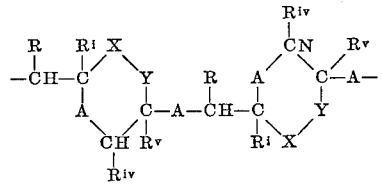

wherein A, R, R¹, X, Y, R^iv, and R^v have the meanings discussed hereinafter.

It is a further object of this invention to provide novel linear copolymers wherein A is a hetero-atom, as hereinafter defined, and is attached to extra-cyclic oxygen atoms.

Still another object of this invention is to provide a process for making the aforesaid copolymers, particularly involving the reaction of a 1:5-diene with an oxide comonomer.

Other objects of this invention will become apparent to those skilled in the art from the following description thereof.

The novel linear copolymers provided by the present invention are formed by the copolymerization of 1:5-diolefinically unsaturated monomers with a co-monomer having the generalized formula: $A'O_x$ wherein $x$ represents one-half the valency of $A'$. Such co-monomers are exemplified by the compounds carbon monoxide, sulfur dioxide, selenium dioxide, Tellurium dioxide, and like compounds including alkyl isocyanides such as methyl and ethyl isocyanides. The polymerization reaction is believed to involve two separate propagation steps. The first is believed to be a 2,6-free radical addition, of $A'O_x$ across the 1:5-diolefin monomer, and the second step a free radical reaction of the first product with a second $A'O_x$ unit. This second intermediate then forms a free radical product with a second molecule of the 1:5-diene and the process repeats itself. It is observed that the instant polymers generally contain approximately two mols of the $A'O_x$ co-monomer for every mol of the 1:5-di-olefinic reactant. Using 1:5-hexadiene and carbon monoxide for purposes of illustration, the mechanism for the polymerization is believed to take place in the following manner:

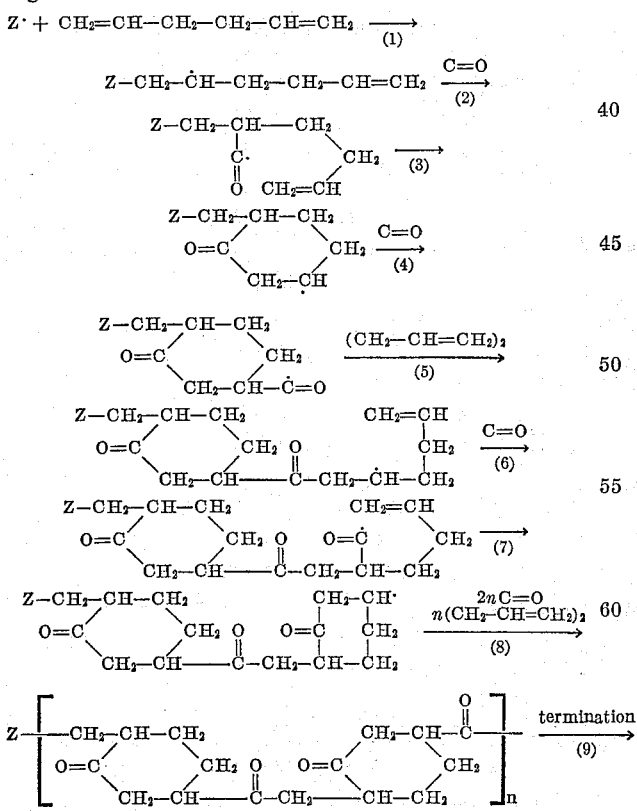

In this mechanism, Z stands for a free radical initiator. Step (1) is the initiation step, (2) is the first intermolecular propagation step, (3) is an intramolecular propagation step, (4) is a second intermolecular propagation step, and steps (5), (6), (7), and (8) repeat steps (1), (2), (3), and (4), leading to the linear copolymer molecule having a repeating unit, before termination of the chain reaction is reached. Termination occurs in the usual fashion for free radical chain polymerization reactions, i.e., when the growing polymer chain reacts with a protonic free radical or other stopping radical.

This copolymerization reaction may be carried out under a wide variety of conditions. The temperature used may vary from 0° to about 100° C., but is preferably elevated above room temperature and at a temperature of from about 40° to about 75° C. is best. The reaction may be conducted at various pressures, preferably superatmospheric since the co-monomer is typically a gas at the reaction temperature. The reaction may conveniently be conducted by charging the reactants into a sealed bomb, introducing a suitable amount of the gaseous co-monomer, and then allowing the reaction to proceed under the autogeneously developed pressure. The equivalent reaction conditions can also be obtained using continuous operation apparatus. Suitable pressures for the polymerization may range from 5 to 1000 atmospheres. Depending primarily on the temperature, the reaction will generally be completed within a necessary period of time from about 1 to 24 hours, typically within about 2 to 7 hours. Longer times may, of course, be used as for instance up to several days.

The ratios of the comonomers in the charge are not critical, since neither comonomer is homopolymerizable under the conditions used. In other words, the copolymerization reaction is much faster than either homopolymerization. Consequently, which ever co-monomer is present in excess, this excess will be left unreacted, and the only co-monomer used will be that required for the copolymer in the 2:1 (oxide co-monomer: diene co-monomer) molar ratio.

Preferably, the polymerization reaction is carried out in a solvent or an aqueous emulsion; however, it is possible to conduct a reaction simply on a mixture of the monomers. Generally any solvent, which is a solvent for the monomers, may be used in the polymerization reaction. Examples of such solvents include aromatic hydrocarbons such as benzene, toluene, ethylbenzene, xylene, etc. Other solvents which may be used include dioxane, ethers of ethylene glycols such as dimethyl ethylene glycol, diethyl ethylene glycol, and alcohols such as methanol, ethanol, propanol, etc., and ketones such as acetone, methylethylketone, diethylketone, and esters such as methylacetate, ethylacetate, ethylpropionate, etc. It will, of course, be understood that the solvent used is aliphatically saturated and substantially inert as far as participating in the polymerization reaction is concerned. In addition, as will be observed by those skilled in the art the co-monomers are capable of reaction with certain solvent classes, and these should obviously be avoided. Generally speaking, the preferred reaction medium is an aqueous emulsion or an aromatic hydrocarbon.

The processes for producing the present copolymers will generally employ catalysts previously used in free radicals olefinic polymerizations. It is particularly advantageous to use peroxygen catalysts such as di-tertiary butyl peroxide. Other peroxide catalysts include inorganic peroxides such as hydrogen peroxide and barium peroxide, etc.; and organic peroxides such as various dialkyl peroxides, alkyl hydrogen peroxides, and diacyl peroxides such as acetyl peroxide and benzoyl peroxide as well as peracids, such as acetic acid and perbenzoic acid and salts of inorganic peracids such as ammonium and potassium persulfate. Cyclic peroxides can also be used such as tetraline hydroperoxide and cumene hydroperoxide. Other "free radicals" catalysts such as azo compounds, e.g. azoisobutyronitrile, and oxygen may be employed as a polymerization catalyst.

Conveniently, the amount of catalyst used may be within the range of about 0.5 to about 20%, but generally for purposes of effectiveness of the reaction and economy, no more than about 8% by weight of the monomer may be used.

As stated hereinbefore, my invention utilizes as one of the monomeric reactants a 1:5-diene. Such 1:5-dienes are particularly well exemplified by compounds such as 1,5-hexadiene;
2,5-dimethyl-1,5-hexadiene;
2,4-dimethyl-1,5-hexadiene;
o-divinylbenzene;
1,2-divinylnaphthalene;
3-allylcyclohexene-1;
4-vinyl-1-cyclohexene;
3-allyl-1-cyclopentene;
4-vinyl-1-cyclopentene;
1,2-divinylcyclohexane;
1-vinyl-1-allylcyclohexane;
3-(3-cyclopentenyl)-1-cyclopentene;
vinylallyldimethylsilane;
vinyl-2-methallyldimethylsilane;
vinylallylcyclopentamethylenesilane;
vinylallylcyclotetramethylenesilane;
vinylallyldimethylgermane;
vinyl-2-methallyldimethylgermane;
vinylallylcyclotetramethylenegermane;
vinylallylcyclopentamethylenegermane;
vinylallyldiphenylsilane;
vinylallyldiphenylgermane;
vinylallyldimethyl tin;
vinylallyldiphenyl tin;
vinylallylsulfone;
vinylallylsulfoxide;
vinylallyl ether;
isopropenylallyl ether;
isopropenylmethallylether;
vinylmethallyl ether;
2,5-dichloro-1,5-hexadiene; and
2,5-diphenyl-1,5-hexadiene.

The metal-containing compounds may be prepared by the Grignard method of synthesis described by Seyferth in his recent publications.

As will be seen, the 1:5-diene monomer may have a hetero-atom in its linear structure, and hetero-atoms including those normally capable of substantially co-valent bonding to carbon atoms such as oxygen, silicon, germanium, tin, sulfur, etc. The only structural requirement is that the atom or atomic grouping intermediate the carbon-carbon double bonds be such that the bond angles will permit formation of the ring formed in the polymer.

As hereinbefore mentioned, the co-monomers may be carbon monoxide, sulfur dioxide, selenium dioxide, and tellurium dioxide, i.e., generally the oxides of the elements of Group VI-A of the Periodic Table. It will be noted that, while such co-monomers are generally written as having a double bond structure, their participation in the polymerization reaction of my invention is not analogous to the behavior of monoolefins (see above mechanism).

Thus, the linear copolymers provided by this invention are those having a repeating unit of the structure:

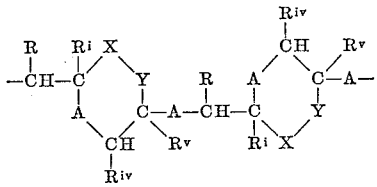

wherein A stands for an element of Group VI-A of the Periodic Table attached to one or two oxygen atoms; individually R represents hydrogen; $R^i$, $R^{iv}$, and $R^v$ may be hydrogen or lower alkyl; individually X and Y may be $-CH_2-$, $-C(R^{ii})H-$, $-C(R^{ii})(R^{iii})-$, di-lower alkyl silyl, cycloalkylsilyl, di-lower alkylgermanyl, cycloalkylgermanyl, di-lower alkylstannyl, cycloalkylstannyl, sulfoxide, sulfone, or oxygen, although only one of X or Y will generally be a hetero-atom in the polymer ring; $R^{ii}$ and $R^{iii}$ individually may be hydrogen or lower alkyl, or together may represent lower alkylene; together R and $R^{ii}$ or $R^{iii}$, or $R^{iii}$ and $R^{iv}$, may be lower alkylene; and together X and Y may be o-phenylene, o-naphthalene, and o-cycloalkylene. In the foregoing structural formula, $n$ is, of course, a small whole number indicating the number of repeating units in the polymeric chain. Lower alkyl means up to about six carbon atoms.

The principles of this invention may, however, also be used to provide novel copolymers of a different general structure as exemplified by, for instance, the product of similarly treating 1,2,3,4,1',2',3',4'-octahydrobiphenyl (a 1:5-diene) with, say, carbon monoxide yielding a polymer with a repeating unit conforming to the structure:

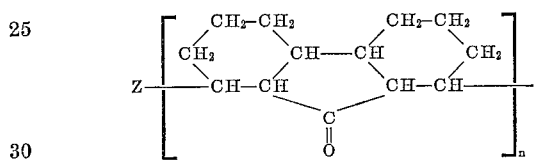

The linear copolymers provided by this invention are useful as fiber- and film-forming materials, providing fibers which may be knitted or woven and used for the manufacture of cloth, and film which may be used as protective coatings or package wrappings, not unlike the properties of polypyrollidine (except, of course, for the absence of an amino group basic reactivity).

Generally speaking, the polymers provided by my invention have a molecular weight above 5,000 and generally in the range of about 10,000 to about 200,000 molecular weight units or even higher. The copolymers formed with silane or sulfone units, however, usually are most readily made within a molecular weight range of from about 70,000 to about 100,000 molecular weight units.

While the above discussion will make it clear that my invention is not limited thereto, the following examples will illustrate preferred embodiments thereof and indicate the manner in which the linear copolymers are formed according to my invention, it being understood that generally the conditions used for any given pair of a 1:5-diene and a co-monomer, may be employed with any other selected pair of reactants. As these examples further illustrate, it is frequently advantageous to include in the reaction mixture aerosol agents and/or inorganic salts such as aluminum nitrate. These additional features are, however, by no means necessary or essential and do not change the nature of the product. They are present merely to ease the separation of the product from the reaction mixture after it is completed.

*Example I.—Linear copolymer of 1,5-hexadiene and sulfur dioxide*

| | |
|---|---:|
| Distilled water _____ml__ | 180 |
| Aerosol OT _____g__ | 1.0 |
| Potassium persulfate _____g__ | 0.15 |
| 1,5-hexadiene _____g__ | 41 |
| Sulfur dioxide _____g__ | 64 |
| Ammonium nitrate _____g__ | 0.5 |

The reactants above were charged to a 500 ml. pressure bottle and shaken at 38—40 C. for six hours. The fluid latex obtained after venting the excess sulfur dioxide was coagulated by addition of a saturated solution of magnesium sulfate. The product was removed by filtration and dried. It had the appearance and texture of a raw rubber gum stock, while wet. In the dry state, it was a rigid polymer.

*Example II*

A pressure vessel was charged at low temperature with one mole of sulfur dioxide, 0.5 mole of 1,5-hexadiene and 0.5 of benzoyl peroxide. After warming to room temperature, the copolymerization was allowed to proceed for thirty hours. The copolymer was removed, and was found to have proceeded to near quantitative conversion. It was found to be soluble in polar solvents, for example, ketones, dimethyl sulfoxide and dimethyl formamide, indicating the linear nature of the copolymer. The intrinsic viscosity was found to be near 1.0, indicating a molecular weight greater than 200,000. The infrared absorption spectrum of the copolymer showed no vinyl unsaturation, and showed typical absorption at 7.7 and at 8.9 microns characteristic for cyclic aliphatic sulfone linkages. A carbon hydrogen analysis of the copolymer confirmed the copolymerization of the comonomers in a 2:1 ratio. The following is a typical analysis: Calculated for $(C_6H_{10}S_2O_4)$: C=34.24%; H=4.76%. Found: C=33.98%; H=4.92%. The copolymer had a softening point greater than 300° C.

*Example III*

A pressure vessel was charged at low temperature with 0.5 mole of sulfur dioxide, 0.25 mole of 1,5-hexadiene, 100 ml. of n-hexane, and 0.3 g. of azo-bis-isobutyronitrile. After warming to room temperature, the reaction was allowed to proceed with stirring for twenty-six hours. After this time the copolymer which had formed was near quantitative yield as an insoluble suspension in the solvent was removed by filtration. It was found to possess properties essentially the same as those of the product from Example II.

*Example IV*

A pressure vessel was charged at low temperature with 0.4 mole of sulfur dioxide, 0.2 mole of 1,5-hexadiene, 12 ml. of 30% hydrogen peroxide, and 7.5 g. of glucose. After warming to room temperature, the copolymerization reaction was allowed to proceed for thirty hours after which time the solid copolymer was removed. Some unreacted sulfur dioxide could be detected, however, the analysis of the product indicated that the two comonomers had entered the chain in the previously established 2:1 ratio. The conversion was near 50%. Again, the copolymer possessed properties similar to those previously observed. The intrinsic viscosity was lower indicating a molecular weight of about 100,000.

*Example V.—Linear copolymer of 1,5-hexadiene and carbon monoxide*

| | | |
|---|---|---|
| Distilled water | ml | 180 |
| Potassium persulfate | g | 0.15 |
| 1,5-hexadiene | g | 41 |
| Carbon monoxide | g | 30 |

The above materials were charged to a 50 ml. pressure reactor and treated as in Example I. The product was recovered in the same fashion and had a similar appearance and texture.

*Example VI.—Linear copolymer of 1,2-divinylcyclohexane and sulfur dioxide*

| | | |
|---|---|---|
| Distilled water | ml | 180 |
| 1,2-divinylcyclohexane | g | 68 |
| Sulfur dioxide | g | 66 |

The above reactants were also charged to a 500 ml. pressure bottle and shaken at 50–55° C. for eight hours. The excess sulfur dioxide was vented as in Example I, and the latex obtained was coagulated by addition of a saturated solution of magnesium sulfate. After filtration and drying, the product was of the general consistency of rubber gum. Its analysis corresponded to the reaction product of 2 mols of sulfur dioxide for every mol of 1,2-divinylcyclohexane, and its organic-solvent solubility demonstrated its linear polymeric characteristics. The procedure of this example could be repeated with the sulfur dioxide using in place of 1,2-divinylcyclohexane an equivalent molar quantity of vinylallylcyclopentamethylenesilane or vinylallylcyclopentamethylenegermane.

*Example VII.—Linear copolymer of isopropenylallyl ether, and selenium dioxide*

| | | |
|---|---|---|
| Distilled water | ml | 200 |
| Aerosol OT | g | 1.06 |
| Azoisobutyronitrile | g | .15 |
| Isopropenylallyl ether | g | 49 |
| Selenium dioxide | g | 115 |

These reactants were charged in the amounts indicated to a 500 ml. pressure bottle, shaken continuously at a temperature of 55—60° C. for ten hours. A fluid latex was obtained which was coagulated after venting the excess selenium dioxide by addition of a saturated solution of calcium sulfate. The recovered product had an analysis corresponding to a reaction of approximately one mol isopropenylallyl ether and two mols of selenium dioxide, exhibited organic-solvent solubility indicating its linear structure, and generally had the appearance of a rubber gum stock. The procedure of this example may also be employed using in place of isopropenylallyl ether vinylmethallyl ether, 2,5-dichloro-1,5-hexadiene, 1,5-hexadiene, vinylallyl sulfone, or vinylallyldimethyl tin, in equivalent molar amounts, to produce organic-solvent soluble, rubbery, gum-like linear polymers.

It will be appreciated that, while my invention has been particularly described with reference to certain specific embodiments thereof, equivalent procedures and materials may be used, and the principle and scope thereof is limited only by the following claims.

I claim:
1. Linear film and fiber-forming copolymers consisting essentially of repeating units having the structure:

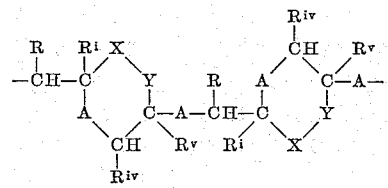

wherein A stands for a member selected from the class consisting of carbon and an element of Group VI-A of the Periodic Table attached to from one to two oxygen atoms;
    taken individually:
        R represents a hydrogen atom;
        $R^i$, $R^{iv}$ and $R^v$ are selected from the group consisting of hydrogen and lower alkyl;
        X and Y are selected from the group consisting of —$CH_2$—, —$C(R^{ii})H$—, —$C(R^{ii})(R^{iii})$—, di-lower alkyl silyl, cycloalkyl silyl, di-lower alkyl germanyl, cycloalkyl-germanyl, di-lower alkylstannyl, cycloalkyl stannyl, sulfoxide, sulfone, and oxygen, provided that only one of X and Y stands for a hetero atom in the polymer ring;
        $R^{ii}$ and $R^{iii}$ are selected from the group consisting of hydrogen and lower alkyl;
    and taken together:
        R with $R^{ii}$ represents lower alkylene,
        R with $R^{iii}$ represents lower alkylene,
        $R^{ii}$ with $R^{iii}$ represents lower alkylene, and
        $R^{ii}$ with $R^{iv}$ represents lower alkylene; and,
        X and Y are selected from the group consisting of o-phenylene, o-naphthylene, o-cycloalkylene.

2. A linear film and fiber-forming copolymer consisting essentially of repeating units having the structure:

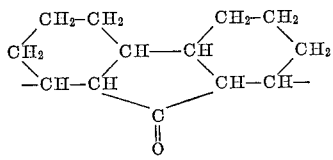

3. A linear film and fiber-forming copolymer consisting essentially of repeating units having the structure:

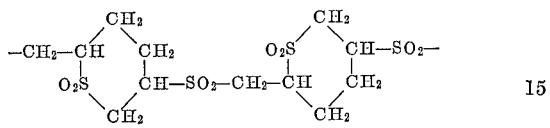

4. A linear film and fiber-forming copolymer consisting essentially of repeating units having the structure:

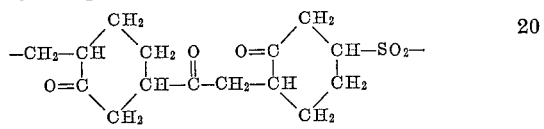

5. A linear film and fiber-forming copolymer consisting essentially of repeating units having the structure:

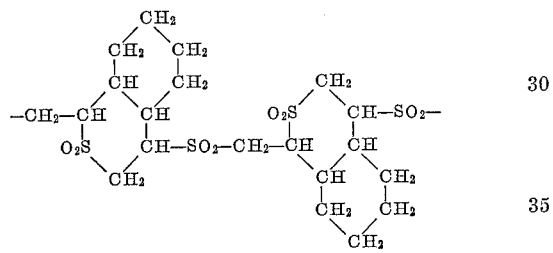

6. A linear film and fiber-forming copolymer consisting essentially of repeating units having the structure:

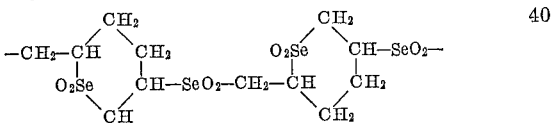

7. A process for preparing linear film and fiber-forming polymers which consists essentially in copolymerizing
  (1) a monomer selected from the group consisting of carbon monoxide and the oxide of an element of Group VI–A and
  (2) a 1,5-di-unsaturated monomer of the formula selected from the group consisting of 1,5-hexadiene; 2,5-dimethyl-1,5-hexadiene; 2,4-dimethyl-1,5-hexadiene; o-divinylbenzene; 1,2-divinylnaphthalene; 3-allylcyclohexane-1; 4-vinyl-1-cyclohexene; 3-allyl-1-cyclopentene; 4-vinyl-1-cyclopentene; 1,2-divinylcyclohexane; 1-vinyl-1-allylcyclohexane; 3-(3-cyclopentenyl)-1-cyclopentene; vinylallyldimethylsilane; vinyl-2-methallyldimethylsilane; vinylallylcyclopentamethylenesilane; vinylallylcyclotetramethylenesilane; vinylallyldimethylgermane; vinyl-2-methallyldimethylgermane; vinylallylcyclotetramethylenegermane; vinylallylcyclopentamethylenegermane; vinylallyldiphenylsilane; vinylallyldiphenylgermane; vinylallyldimethyl tin; vinylallyldiphenyl tin; vinylallylsulfone; vinylallylsulfoxide; vinylallyl ether, isopropenylallyl ether; isopropenylmethallylether; vinylmethallyl ether; 2,5-dichloro-1,5-hexadiene; and 2,5-diphenyl-1,5-hexadiene;

in the presence of from 0.5 to 20%, by weight of the reaction mixture, of a free radical olefinic polymerization catalyst, at a temperature between about 0° and 100° C. and a pressure between about 5 and 1000 atmospheres.

8. The process of claim 7, wherein the molar ratio of the amount of the first of said monomers to said 1,5-di-unsaturated monomer in the reaction mixture is approximately 2:1.

References Cited by the Examiner
UNITED STATES PATENTS

| | | | |
|---|---|---|---|
| 2,914,511 | 11/1959 | Arede et al. | 260—79.3 |
| 3,133,903 | 5/1964 | Frazer | 260—79.3 |

FOREIGN PATENTS 152,589   7/1953   Australia.

WILLIAM H. SHORT, Primary Examiner.

JOSEPH R. LIBERMAN, Examiner.